INVENTORS:
J. A. Koskimies, A. I. Lehtinen, E. S. Rautila and T. H. Kuusisto

United States Patent Office 3,563,667
Patented Feb. 16, 1971

3,563,667
DEVICE FOR MEASURING THE FORMATION AND THE WIRE MARK OF PAPER
Jouni Aslak Koskimies, Vekarokatu 1, as. 1, and Antti Ilmari Lehtinen, Tourula 27, both of Jyvaskyla, Finland; Esko S. Rautila, Lentajantie 1, Harmala, Tampere, Finland; and Timo H. Kuusisto, Peltolamminkatu 2 I 60, Koivistonkyla, Finland
Filed Feb. 16, 1968, Ser. No. 706,114
Int. Cl. G01n 21/18
U.S. Cl. 356—199          13 Claims

ABSTRACT OF THE DISCLOSURE

A device for measuring paper formation includes a light source projecting a luminous flux through the paper being measured, an optical objective system and an aperture stop upon the light-sensitive cathode of a photomultiplier tube. This tube produces a current which varies depending upon fluctuations in the transparency of the paper and which is amplified in a preamplifier. Another unit amplifies the alternating current component which is again amplified and rectified in a rectifying circuit. The direct current component is amplified depending on the formation of the paper. An instrument is used for checking the operation while an indicating device indicates paper formation. A slow control circuit is used for maintaining the direct current component at constant magnitude; it includes a slow differential amplifier which is connected to the above-mentioned preamplifier and which controls the high voltage pack. The high voltage pack is connected to the photomultiplier tube. Current is supplied to the various parts of the device by a stabilized voltage source.

The invention concerns a device by means of which it is possible to measure the formation of paper and its wire mark either as on-machine or off-machine measurement, in order to disclose the properties of the paper.

The measurement is based on passing a light beam through the paper and letting it act on a light-sensitive element on the other side of the paper. A current proportional to the light intensity is produced in this element. The current is composed of a direct current component and an alternating current component. The D.C. component is determined in accordance with the average transparency of the paper, and the A.C. component represents the nonuniformity in paper formation and the strength of wire marking. The invention concerns such a device which has been built to operate according to the principle that for a measure of the paper formation quality and of the wire mark the A.C. component/D.C. component ratio $1_m/1_a$ is used. The $1_m/1_a$ ratio is formed in that the denominator $1_a$ is maintained constant with the aid of a slow control circuit, which, e.g., in the event of decrease of the average luminous flux incident on the cathode of the photomultiplier tube raises the voltage supplied to the tube and thus increases the sensitivity of the tube so that the mean plate current is restored to the desired value.

In the copending patent application Ser. No. 705,682 of the same inventors a method has been presented for measuring the wire mark of paper, in which a beam of light is used to measure the extent of wire markings upon a sheet of paper which has dried upon a wire mesh in a papermaking machine. The beam of light is passed through a sheet of paper and then strikes a photomultiplier tube which produces an electrical current having A.C. and D.C. components. A milliammeter measures the D.C. component. The A.C. component before being measured is passed through a filter which removes from it all frequencies except the frequency consistent with the wire marking. The filter may be connected with a switch and the switch may be a selector switch to vary the frequency bands passed by the filter. An instrument which measures the ratio of the filtered A.C. component to the D.C. component can indicate as percentage the extent of the wire marking.

In the copending patent application No. 705,683 of the same inventors a method and device for measuring nonuniformity of paper formation, independent of the opacity of the paper, have been presented. The measurements are carried out by passing a light beam through a moving paper web and causing the beam to strike a photomultiplier tube connected with a differentiating element dividing the anode current produced in the photomultiplier tube into a D.C. component and an A.C. component. The D.C. component is transmitted to a control element which so regulates by feedback the anode voltage of the multiplier tube that the D.C. component remains constant. Then an instrument measuring the A.C. component will measure directly the paper formation.

The object of the invention is to provide such a device which operates according to the principle outlined above.

Another object is the provision of a measuring device which utilizes the principles disclosed in the two above-mentioned copending patent applications but which constitutes a substantial improvement thereover since it makes possible a simultaneous measurement of both the paper formation and the wire marking.

A device according to the invention comprises a light source placed on one side of the paper; an optical objective system and stop or diaphragm placed on the opposite side, through which the luminous flux from the light source goes to the light-sensitive cathode of a photomultiplier tube; the said photomultiplier tube producing a current varying in accordance with the fluctuations in transparence of the paper; a preamplifier for amplification of the measurement signal delivered by the photomultiplier tube, a unit comprising an A.C. amplifier and a rectifying circuit for amplification and rectifying of the A.C. component; an output amplifier for further amplification of the direct current depending on the paper formation which comes from the unit just mentioned; a check instrument for checking the operation of the device; an indicating device for indicating the paper formation; and moreover included for the purpose of maintaining the direct current at constant magnitude a slow control circuit, comprising a slow differential amplifier connected to the preamplifier mentioned heretofore, which differential amplifier notes the D.C. component and controls the high-voltage pack, the said high-voltage pack being connected to the photomultiplier tube; and in addition the device contains a stabilized voltage source, which feeds power to the different units of the device.

For measurement of the wire mark and in order to render possible other frequency analyses there has been connected to the preamplifier of the above-mentioned device an output amplifier which has an output for connecting a wire mark device or other frequency analyzer.

For the purpose of its calibration the device includes a calibration signal forming device, from which a calibration signal can be fed by the anode lead to the preamplifier of the above-mentioned device, and a device for checking the output voltage of the preamplifier.

For calibration check purposes there is also an arrangement of devices by means of which the mean value of the anode current and the transfer constant of the anode current A.C. component-handling circuits are checked and, when needed, corrected to have the proper value, in which case the indication of the device is correct.

The device also includes a zero shift unit, by means of which the indication range of the measuring device can be displaced, this unit being connectable by means of a switch to the unit comprising the A.C. amplifier and rectifying circuit of the device.

In the device such a preamplifier is employed which has a low input impedance compared to the impedance of the anode lead with reference to chassis in the frequency range that comes into question. The advantage is thus gained that the anode lead of the photomultiplier tube may be comparatively long without causing the frequency range of the measuring instrument to become narrower, which is particularly important when the wire mark is measured.

The high-voltage pack of the device consists of an oscillator and rectifying and filter circuit serving to produce the high voltage for the photomultiplier tube. The amplitude of oscillation of the said oscillator may be controlled by a current proportional to the output voltage of the differential amplifier mentioned heretofore, and the feedback maintaining the oscillation of the oscillator is accomplished by an electronic switching element, the feedback reaction being independent of the amplitude of oscillation, with the result that the current to be supplied to the oscillating circuit and the high voltage to be produced, which is proportional to the last-mentioned, are proportional to the control current but independent of the amplitude of oscillation.

The optical objective system comprised in the device has been so placed with reference to the paper web-guiding plane that a magnified image is obtained on the diaphragm plate of the stop; this enables a larger diaphragm aperture to be used in the stop with resulting advantages, which will be disclosed later. The aperture in the stop must not necessarily be round, and its dimension may be larger in the direction across the paper web than in its direction of travel. The stop may also have several apertures which are placed on a line in the direction of web travel.

The device includes a housing containing measuring equipment, to the front side of which there has been turnably attached a plate, which can be secured in any desired position in order that the fork formed by rods fixed to the said plate and which at their free ends carry the measuring head with its paper web-guiding dishes can be brought into a position such that the paper web is urged against the guiding dish on the side of the light detector. The said plate can be rotated at least through an angle of ±180 degrees.

The invention is described in closer detail with reference to the attached drawing.

Figure 1:
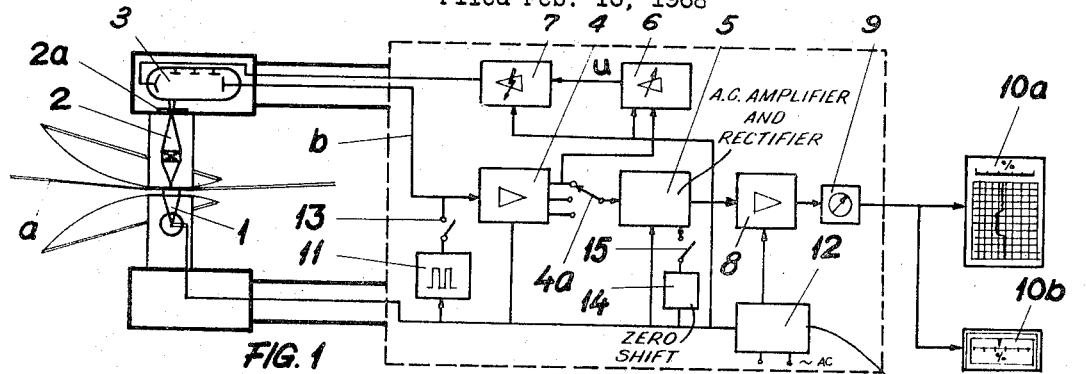
FIG. 1 is a diagrammatic representation of a device according to the invention.

In the device shown in FIG. 1 there is an incandescent lamp 1, which is located under the paper web $a$. On the opposite side of the paper web there is an optical system 2, which collects the light rays emitted by the said lamp 1 and transmitted by the paper web and concentrates them on the stop 2a, through the aperture in which they fall onto the cathode of a photomultiplier tube 3. Since the luminous flux incident on the cathode varies, depending on the paper formation, a fluctuating plate current is produced in the photomultiplier tube.

The said plate current is conducted by the plate lead $b$ to the preamplifier 4. This is connected through the selector switch 4a to the unit 5 containing an A.C. amplifier and a rectifying circuit and which notes the alternating current component. The said unit 5 is connected to the output amplifier 8. From this a D.C. current proportional to the A.C. component of the measuring signal is carried to the check instrument 9 and, hence, further to the recorded 10a and the indicating instrument 10b.

The above-mentioned preamplifier 4 is connected to a slow differential amplifier 6, which notes only the direct current component. This differential amplifier 6 is connected, in its turn, to the high voltage pack 7, which is connected with the photomultiplier tube 3. By this means a slow-action control circuit is established, which maintains the direct current component at constant magnitude.

The device also includes a stabilized voltage source 12, which supplies power to the different units of the device.

For the purpose of calibration the device includes a calibration signal forming device 11, which supplies a calibration signal to the preamplifier 4 mentioned heretofore when the device is being checked by operating the switch 13.

Furthermore, the device includes a start-point shifting or zero suppression unit 14, by means of which the indication range of the measuring device may be displaced. The shifting unit 14 can be connected, by operating the switch 15, to the unit 5 mentioned heretofore, which contains an A.C. amplifier and rectifying circuit.

Figure 2:
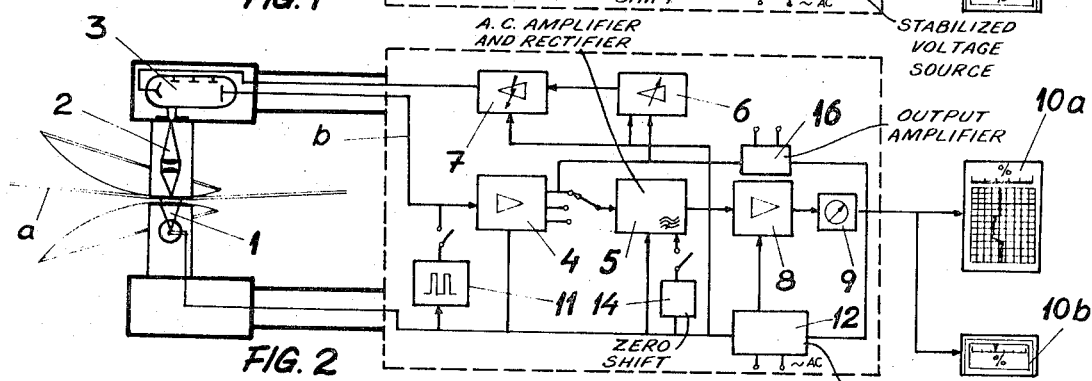
FIG. 2 shows the same device, with an attached auxiliary device for connecting a wire mark analyzer or other frequency analyzer.

The device illustrated by FIG. 2 differs from that shown in FIG. 1 only in that it comprises auxiliary equipment for the connecting of a wire mark analyzer or of some other frequency analyzer.

The same reference numerals have been used for equivalent parts in FIG. 1 and FIG. 2. The said auxiliary equipment comprises an output amplifier 16 for the wire mark signal or other equivalent signal, to which amplifier the said signal is supplied from the preamplifier 4, and the output amplifier 16 being supplied with power by the stabilized voltage source 12.

The optical system in the devices according to FIGS. 1 and 2 has been so placed with reference to the paper web-guiding plane that a magnified image is obtained on the diaphragm plate of the stop 2a. The aperture in this plate must not necessarily be round, and it may be advantageous in certain instances, e.g., when the wire mark is measured, if the said aperture has a larger dimension in the direction across the paper web than in the direction of its travel or if more than one aperture is used and in that case the apertures are placed so as to be in a row in the direction of web travel. The circumstance that with the aid of the optical system a magnified image is obtained on the diaphragm plate affords the advantage that better optical efficiency is gained, and a larger aperture size may be used. Hence follows that the aperture is easier to make and the reliability of the device in operation improves because a larger aperture will have a better tendency to remain unobstructed by dirt.

Figure 3:
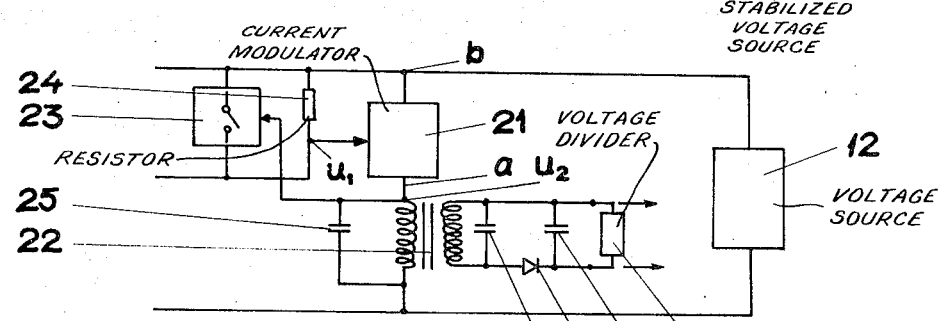
FIG. 3 is a diagrammatic representation of the high-voltage pack comprised in the device.

FIG. 3 displays the high-voltage pack 7 comprised in the device. The current I, which is proportional to the output voltage of the differential amplifier 6, controls the high-voltage-producing unit 7. When the switching element 23 is nonconductive, the voltage $u_1$ occurs across the resistor 24. This controls the element 21, which supplies to the primary of the transformer 22 a current proportional to the control voltage $u_1$. The inductance of the transformer 22 together with the capacitance of the condenser 25 or 26 connected to the primary or secondary and with the winding capacitance constitute a circuit oscillating substantially with the frequency determined by the said circuit constants. The feedback maintaining this oscillation is produced when the transformer voltage $u_2$ is allowed to control the switching element 23 so that this element 23 is nonconductive during those half-waves of $u_2$ when the potential at the point $a$ has made a swing towards the potential of point $b$, and conductive during the opposite half-waves. To the secondary of the transformer 22 there is connected, after the rectifying and filtering circuit 27, 28, the load 29, which is substantially a resistive load.

The element 21 supplies to the transformer a current chopped in accordance with the rhythm at which the switching element 23 operates, and the intensity of this current is proportional to the control current I. The secondary current of the transformer 22 is then also proportional to the control current I, and consequently the voltage across the load 29 is proportional to the control current I, too.

Since the load 29 is the voltage divider for the photomultiplier tube, it is advantageous to design the rectifying and filtering circuit to operate as a voltage multiplying circuit from which taps can be carried to the voltage divider, by which the amount of power required becomes less than what would be needed if no such taps were provided.

Figure 4:
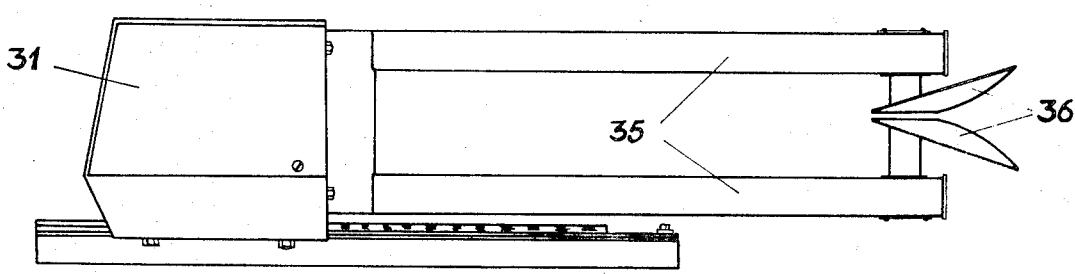
FIG. 4 shows the measuring device, viewed from one side.
Figure 5:
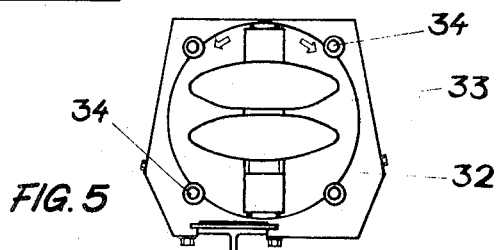
FIG. 5 shows the same device, viewed from the front.

In the embodiment shown in FIGS. 4 and 5 the paper formation measuring instrument has been mounted beside the paper web by means of a guide rail arrangement in order that the device might be moved in the direction across the paper web so as to position the measuring head properly with reference to the paper web. The device comprises a housing 31 containing measuring equipment. On the front side 32 of the housing there has been turnably attached a plate 33, which can be turned at least through an angle of ±180 degrees. The plate can be locked in any desired position with the screws 34. From the said plate 33 there depart rods 35 forming a fork, the free ends of these rods forming the measuring head carrying guiding dishes 36, between which the paper web passes. Since the rods 35 forming the fork are fixed to the turnable plate 33, the fork element can be locked in a position such that the paper web is urged against the guiding dish on the side of the light indicator, whatever the inclination at which the web travels. Since the fork element may be rotated through ±180 degrees, being fixed to the turnable plate, the fork element can be given a position such that the guiding dish at its end on the side of the light detector is urged either against the upper surface or the lower surface of the paper web. This turnability of the fork element is highly important when the wire mark is measured, such wire marking occurring only on one side of the paper web.

What is claimed is:

1. Device for measuring paper formation and for enabling measurement of wire mark and other kinds of frequency analysis to be undertaken, having a light source placed on one side of the paper; an optical objective system and an aperture stop placed on the opposite side of the paper and through which the luminous flux from the light source goes to the light-sensitive cathode of a photomultiplier tube, the said photomultiplier tube producing a current varying in accordance with the fluctuations in transparency of the paper; wherein the improvement comprises a preamplifier for amplification of the measuring signal supplied by the photomultiplier tube; a unit containing an alternating current amplifier and a rectifying circuit for amplification and rectifying of the alternating current voltage component; an output amplifier for further amplification of the direct current depending on the formation of the paper which comes from the above-mentioned unit; a check instrument for checking the operation of the device, an indicating device indicating the paper formation; and which in addition contains for maintaining the direct current component at constant magnitude a slow control circuit, comprising a slow differential amplifier connected to the preamplifier mentioned heretofore, this differential amplifier noting the direct current voltage component and controlling the high voltage pack, said high voltage pack being connected to the photomultiplier tube; and the device furthermore comprising a stabilized voltage source, which supplies power to the different units of the device; and also containing in addition an output amplifier connected to the preamplifier mentioned heretofore, this output amplifier having an output for a wire mark device or other frequency analyzer.

2. Device according to claim 1, to which has been connected a calibration signal forming device from which a calibration signal may be supplied through a switch into the preamplifier for checking the operation of the device.

3. Device according to claim 1, which has for checking the calibration an arrangement of means by the aid of which the average value of the anode current and the transfer factor of the anode current alternating current component-handling equipment are checked and may be corrected to have the proper value, when needed.

4. Device according to claim 1, comprising a starting-point shifting unit by the aid of which the indication range of the measuring device may be displaced, this unit being connectable by means of a switch to the unit comprising an alternating current amplifier and rectifying circuit.

5. Device according to claim 1, the high voltage pack in whch consists of an oscillator and a rectifying and filtering circuit, for producing the high voltage for the photomultiplier tube.

6. Device according to claim 5, the amplitude of oscillation of the oscillator comprised in which may be controlled by a current proportional to the output voltage of the differential amplifier mentioned heretofore which is comprised in the device, and in which the feedback maintaining the oscillation of its oscillator is accomplished by an electronic coupling element, the strength of the feedback reaction being independent of the amplitude of oscillation, when the current to be fed into the oscillatory circuit of the oscillator and the high voltage to be produced which is proportional to this current are proportional to the control current but independent of the amplitude of oscillation.

7. Device according to claim 1, in which the input impedance of the preamlpifier comprised in it is small compared to the impedance of the anode lead with reference to the chassis of the device in the frequency range that comes into question.

8. Device according to claim 1, in which the optical objective system comprised in it has been so placed with reference to the paper web-guiding plane that a magnified image is obtained on the diaphragm plate of the stop.

9. Device according to claim 1, in which the diaphragm of the stop contained in it has been provided with a round aperture.

10. Device according to claim 1, in which the diaphragm of the stop in it has been provided with an aperture having larger dimension in the direction across the paper web than in the direction of web travel.

11. Device according to claim 1, in which the diaphragm of the stop in it has been provided with more than one aperture, these apertures having been placed so as to be in a row in the direction of web travel.

12. Device according to claim 1, comprising a housing containing measuring equipment, to the front side of which housing there has been turnably attached a plate which can be locked in any desired position, in order that the fork formed by rods fixed to the said plate, which rods carry at their free ends a measuring head including paper web-guiding dishes, can be brought into a position such that the paper web is urged against the guiding dish on the side of the light detector.

13. Device according to claim 12, in which the turnable plate comprised in it has been arranged to be rotatable at least through ±180 degrees so that the measurement can be made from either side of the paper web as desired.

References Cited

UNITED STATES PATENTS

| | | | |
|---|---|---|---|
| 921,083 | 5/1909 | Chaney | 250—219F |
| 2,290,775 | 7/1942 | Snyder, Jr. | 250—214X |
| 2,347,015 | 4/1944 | Waloschak | 250—214X |
| 2,631,243 | 3/1953 | Weber et al. | 250—219FX |
| 2,641,158 | 6/1953 | Sweet | 250—219FX |
| 3,026,415 | 3/1962 | Lake, Jr., et al. | 250—219DSX |
| 3,393,319 | 7/1968 | Randall et al. | 250—214X |
| 3,400,270 | 9/1968 | Durig | 250—214X |
| 3,418,482 | 12/1968 | Masson | 250—219DS |
| 3,437,823 | 4/1969 | Joyce | 250—214X |
| 3,340,400 | 9/1967 | Quittner | 250—219DS |

JAMES W. LAWRENCE, Primary Examiner

C. M. LEEDOM, Assistant Examiner

U.S. Cl. X.R.

162—263; 250—210, 219